Feb. 29, 1944.　　S. J. WOSZCZYNA　　2,343,164
BORE LOCATOR FOR LATHES
Filed Oct. 3, 1941　　4 Sheets-Sheet 1
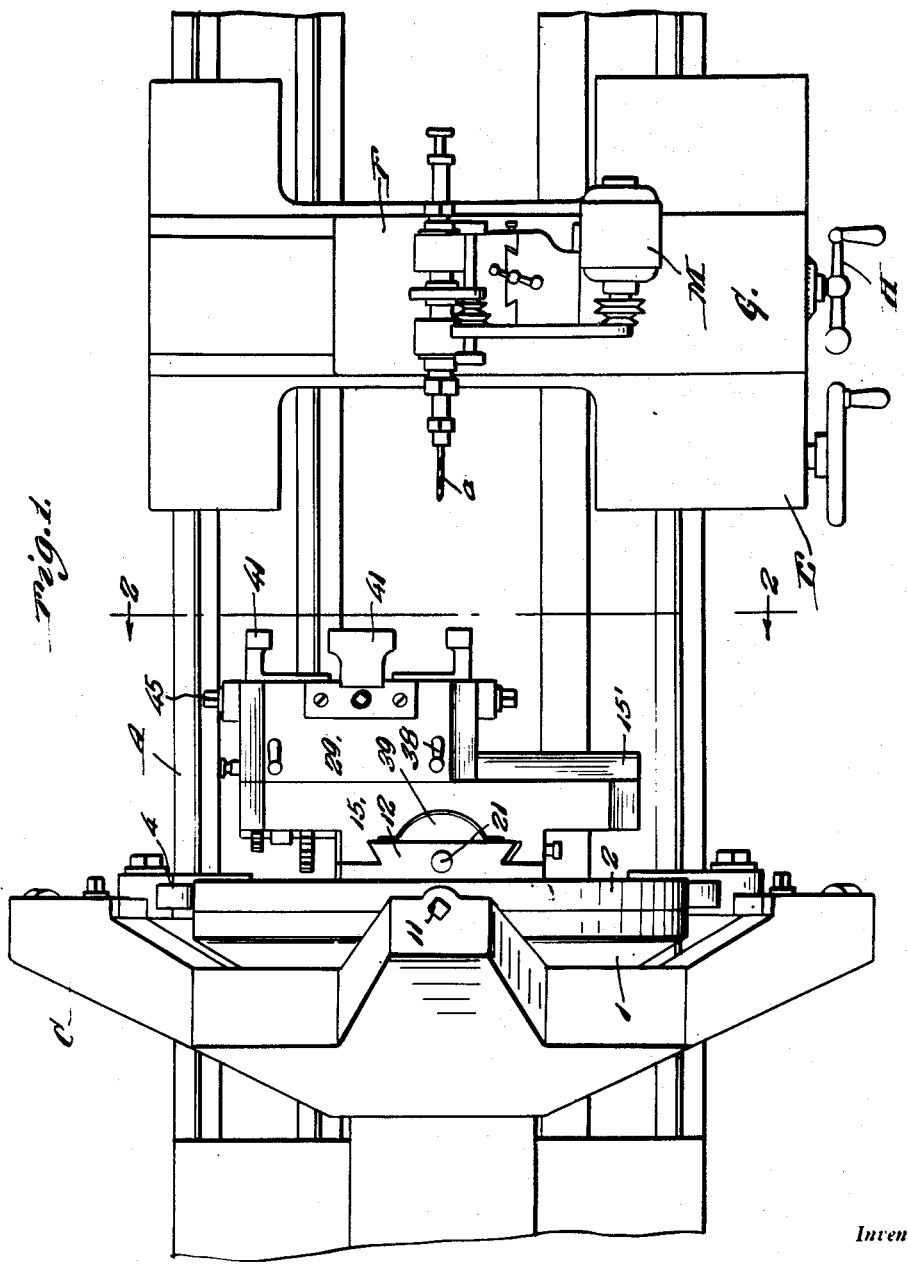
Inventor
Stanley J. Woszczyna
By Clarence A. O'Brien
Attorney

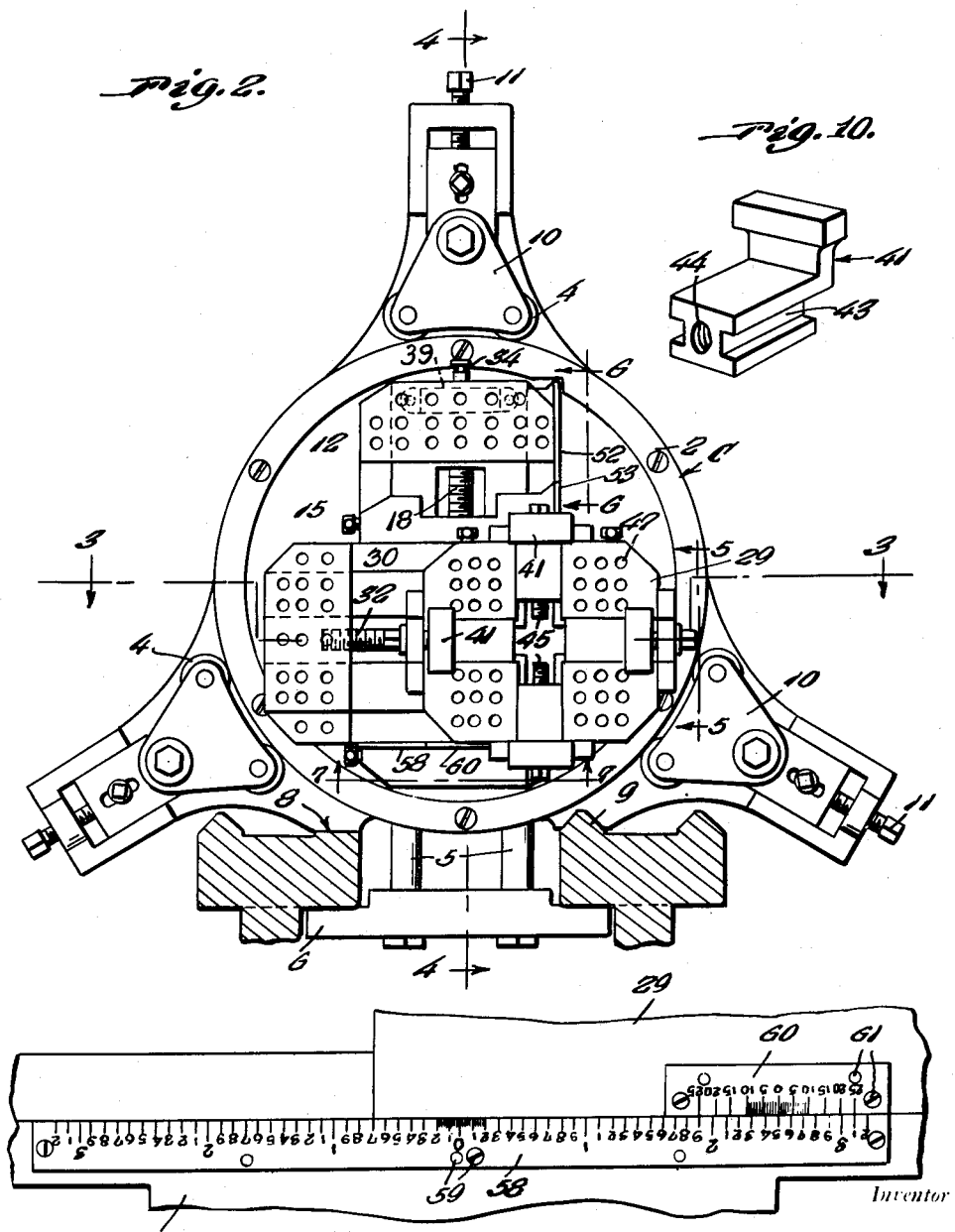

Feb. 29, 1944.   S. J. WOSZCZYNA   2,343,164
BORE LOCATOR FOR LATHES
Filed Oct. 3, 1941   4 Sheets-Sheet 3
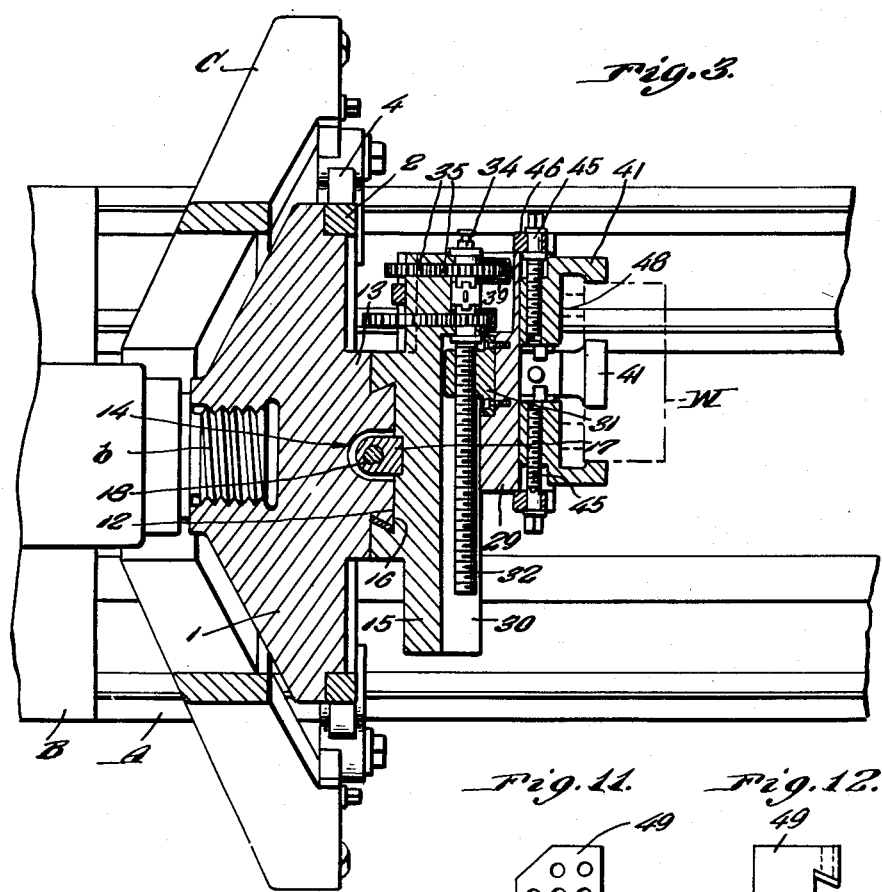
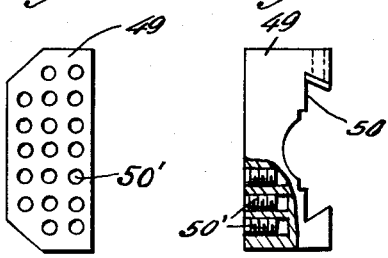
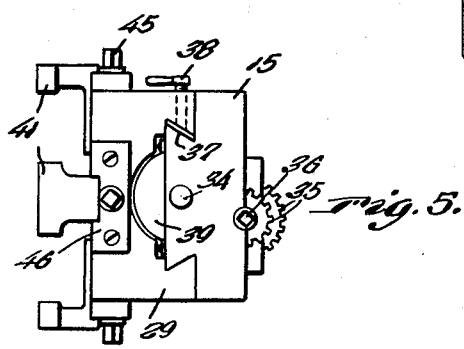
Inventor
Stanley J. Woszczyna
By Clarence A. O'Brien

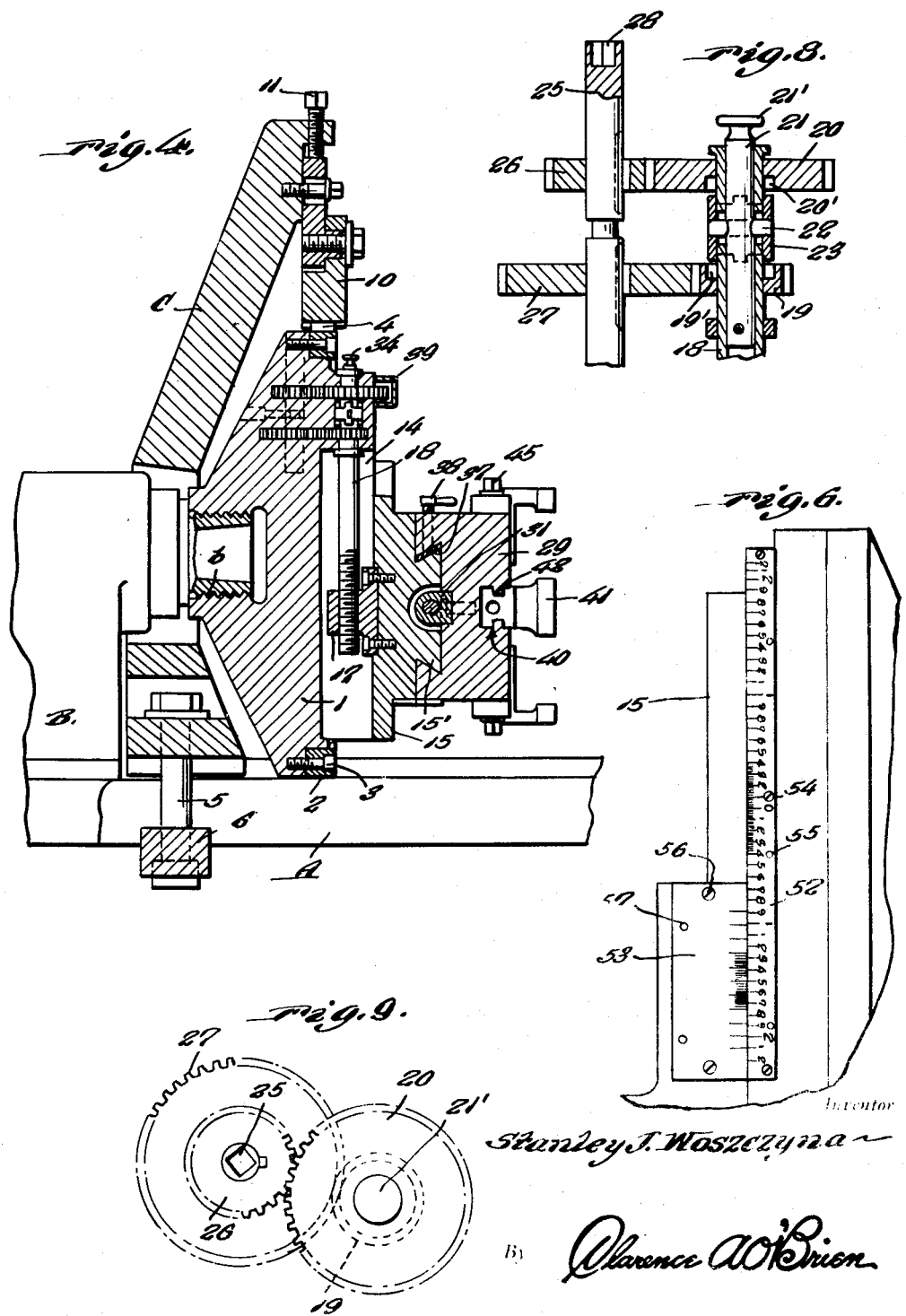

Patented Feb. 29, 1944

2,343,164

UNITED STATES PATENT OFFICE 2,343,164

BORE LOCATOR FOR LATHES

Stanley J. Woszczyna, New Britain, Conn.

Application October 3, 1941, Serial No. 413,542

7 Claims. (Cl. 77—63)

This invention relates to a bore locator for use on a lathe, the general object of the invention being to provide means for adjustably holding a piece of steel or other material so that holes can be accurately bored therein for forming dies, drill jigs or other tools, the device being attached to the rotary shaft or spindle of the lathe and having means for moving the work piece in two directions at right angles to each other and for accurately adjusting such means so that the work piece can be adjusted to the exact point where the drill is to bore the hole, this adjustability also enabling the work piece to have a plurality of holes bored therein, all accurately placed.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of a lathe showing the invention applied thereto and this view also showing a drilling attachment connected with the carriage of the lathe for boring holes in the work piece held by the device, this attachment being especially useful for boring small holes in the work piece and where the device does not rotate fast enough for the boring of such small holes.

Figure 2 is a section on the line 2—2 of Figure 1.

Figure 3 is a section on the line 3—3 of Figure 2.

Figure 4 is a section on the line 4—4 of Figure 2.

Figure 5 is a section on the line 5—5 of Figure 2.

Figure 6 is a section on the line 6—6 of Figure 2.

Figure 7 is a section on the line 7—7 of Figure 2.

Figure 8 is a sectional detail view showing the gear means for adjusting each slide member by a manually rotated shaft, with the clutch means for connecting the gears of the screw shaft to said shaft.

Figure 9 is a top plan view of Figure 8.

Figure 10 is a view of one of the jaws.

Figure 11 is a front elevational view of one of the weight members, and

Figure 12 is an edge elevational view thereof, partly in section.

In these views the letter A indicates a portion of the body of a lathe and the letter B indicates the head stock of the lathe and the letter b shows the spindle nose of the lathe and the body 1 of the invention has a threaded hole therein which receives the spindle nose as shown more particularly in Figures 3 and 4. This body is of circular shape and tapers to the part having a threaded hole therein and a ring 2 of hard metal is bolted to the periphery of the body at the front side thereof by the bolts 3. This ring is engaged by the rollers 4 of the steady rest C which is connected to the body of the lathe by the bolts 5 and the clamping bar 6 carried by the bolts and engaging the under faces of the track part of the lathe. The parts are arranged as shown in Figures 3 and 4 so as to give clearance between the steady rest and the head stock of the lathe and lower portions of the steady rest rest upon the body part of the lathe as shown at 8 and 9 in Figure 2, the seat shown at 9 including a notch in a portion of the steady rest receiving a V-shaped part of the body while the seat 8 is flat. In order to prevent the steady rest from interfering with the movements of the carriage of the lathe the lower arms thereof can be placed at any desired angle relative to the body of the lathe. The steady rest is of the usual or any desired construction and is shown as provided with three arms each of which carries a roller carrying member 10 sliding in the arm and adjusted by means of a screw bolt 11 so that the rollers 4 can be caused to properly engage the ring 2. Thus the body 1 will be rotated from the spindle of the head stock and it is firmly held against wobbling motion during rotation by the rollers of the steady rest.

On the front face of the body is a guide 12 of dovetail shape in cross section and this guide extends diametrically across said face and is located on a raised part 13 of the front face of the body, this raised part extending in the same direction as the dovetailed shaped part. A groove 14 extends longitudinally through the center of the dovetail shaped part and the part 13. A slide member 15 has a dovetail groove 16 in its rear face which slides on the dovetail part 12 and a nut member 17 is fastened to the bottom of the groove and extends into the groove 14. A screw shaft 18 extends into the groove 14 and through the threaded hole in the nut member 17 and this shaft is rotatably supported in a part of the body 1 which forms the end wall of the groove 14 and in this part of the body 1 is rotatably arranged a small gear 19 which is loosely arranged on the adjacent end of the shaft 18, this part of the shaft 18 being of tubular construction as shown in Figure 8. A large gear 20 is rotatably arranged in the said part of the body 1 and is loosely arranged on the shaft 18. A stem 21 extends into the shaft 18 through a side wall of that part of the body 1 into which the gears 19 and 20 are rotatably arranged and the shaft 18 is formed with slots therein through which passes a pin 22 carried by the stem 21 and a clutch sleeve 23 surrounds and slides on a part of the shaft 18 and is connected with the pin 22. The gears 19 and 20 are provided with clutch parts 19' and 20', respectively. Thus when the stem 21 is moved by its handle 21' to the position shown in Figure 8 both gears 19 and 20 are disconnected from the shaft 18 and can rotate without imparting rotary movement to the shaft 18. However, by pulling the stem 21 outwardly the clutch sleeve 23 will engage the clutch part 20' and gear 20 and then the gear 20 will rotate the shaft 18. By pushing the stem 21 inwardly to place the sleeve 23 in engagement with the gear 19 the said small gear 19 will cause rotary movement of the shaft 18 therewith.

A manually operated shaft 25 is rotatably arranged in the body adjacent that part which carries the outer end of the shaft 18 and the gears and this shaft 25 carries the small gear 26 which meshes with the large gear 20 and the large gear 27 which meshes with the small gear 19. The outer end of the shaft 25 is provided with a socket 28 for receiving a wrench and thus it will be seen that when the shaft 25 is turned by an operator gripping the wrench, the shaft 18 will be rotated either through the gears 19 and 27 or the gears 20 and 26 in accordance with the position of the clutch means and this arrangement of gears will permit the operator to rotate the shaft 18 at two different speeds. This enables him to rotate the shaft 18 at considerable speed to move the slide member 15 to an approximate position and then by shifting the clutch means and turning the shaft 25 he can make the last part of the movement of the member 15 slow and thus secure a finer adjustment.

The outer face of the slide member 15 has a dovetail shaped part 15' thereon which extends longitudinally of the member 15 and at right angles to the direction of sliding movement of the member 15 and a jaw carrying member 29 has a dovetail-shaped groove 30 therein which engages the dovetail-shaped part 15' for sliding movement. A nut member 31 is bolted to the inner face of the member 29 and operates in the groove 30 and a screw shaft 32 passes through the nut member and is rotatably supported at one end of the member 15 which closes one end of the groove 30. This screw shaft 32 can be rotated at two different speeds by the same arrangement shown in Figures 8 and 9, the clutch operating stem of the shaft 32 being shown at 34 in Figure 3 and the two sets of gears being shown generally at 35 with the manually operated shaft which is similar to the shaft 25 being shown at 36 in Figure 5.

Each of the members 15 and 29 is locked in adjusted position by shims or gibs 37 placed between an edge of a dovetail-shaped part and a wall of the dovetail-shaped groove and manipulated through means of a manually operated screw shaft 38 as more clearly shown in Figures 4 and 5. A guard 39 is provided for each of the large gears of the shafts 18 and 32 for covering the projecting parts of such gear.

The outer face of the member 29 is formed with the grooves 40 for the jaws 41, each groove having ribs 42 on its side walls for fitting in grooves 43 in the side edges of the base of the jaw, one of the jaws being shown in detail in Figure 10 and the base of each jaw is formed with a threaded hole 44 for receiving a screw shaft 45 which is rotatably supported by the member which carries it so that by turning the shaft the jaw can be moved inwardly or outwardly, the jaws being moved inwardly, of course, to grip the work piece such as shown at W in dotted lines in Figure 3. Preferably each screw shaft 45 is rotatably arranged in a plate 46 fastened to the member 29 as shown more particularly in Figure 5.

The outer face of the member 29 is provided with a plurality of holes 47, see Figure 2, these holes being threaded to receive screws or bolts, some of which may be used for fastening the parallels 48 in place as shown in dotted lines in Figure 3 and some of the screws can be used for holding a plate on the member 29 to prevent the drilling bit from injuring the said member 29.

Figure 11 shows a counterweight 49 having a dovetail-shaped groove 50 therein for fitting over the dovetail-shaped parts of the guide 12 or slide member 15 to balance the device when one of the members 15 or 29 is moved to an end position, the counterweight being placed at the other end of the dovetail-shaped part as shown by the dotted lines in Figure 2 and these counterweights are held in place by shims or gibs. Each counterweight is provided with a plurality of holes 50' in its outer face, the outer portions of which are screw-threaded as shown in Figure 11 and these holes are adapted to receive small weights for increasing the weight of the body of the counterweight as desired or necessary.

Some of these counterweights may be provided with cut-away portions to clear the shields or guards 39. When the work table 29 is positioned at or near the axis of the head stock the use of the counterweights is dispensed with.

A pair of scale plates 52 and 53 are provided for facilitating the adjustment of the member 15 on the body, the plate 52 being of elongated form and fastened to the part 13 at one side thereof by the screws 54 and the dowel pins 55 while the plate 53 is much shorter than the plate 52 and is connected to a side edge of the member 15 by the screws 56 and the dowel pins 57. These plates are shown in Figure 6 in detail. A scale plate 58 of considerable length is connected to one side edge of the member 15 by the screws and dowel pins 59 and a short scale plate 60 is connected to a side edge of the member 29 by the screws and dowel pins 61, see Figure 7. The graduations of both sets of scale plates are placed very closely together so as to enable the operator to make very fine adjustments of the members 15 and 29 and accurately place the work piece in position to receive the bit, Figures 6 and 7 only showing a few of the closely placed graduations. Thus it will be seen that the jaw carrying member 29 can be moved longitudinally on the member 15 and this member 15 can be moved at right angles to the direction of movement of the member 29 on the body, thus enabling the work piece held by the jaws to be moved in two directions at right angles to each other and through means of the gearing each member can be finely adjusted in accordance with the graduations on the scale plates by manual turning movement of the shaft 25 or 36. Of course, the jaws can be moved inwardly and outwardly by turning the screw shafts 45.

In boring large holes in the work piece the drilling machine must have its bit held stationary as the rotary movement of the body 1 will rotate the work piece to cause the bit to bore holes in the work piece as the same rotates but for smaller holes I provide an attachment shown generally at F, the spindle of which is rotated from a motor M and this attachment is placed on the carriage E of the lathe and a small bit a is carried by this attachment. In this case both the bit and the work piece rotate for causing the bit to bore holes in the work piece. The attachment is shown in Figure 1 and the base G of the attachment is moved transversely on the carriage by means of a screw shaft, not shown, operated by the handle H.

A guard, such as shown at 39, can be used for any one of the gears, where necessary. Also some of the threaded holes in the member 29 can be used for bolting the work piece to the member 29 and when it is not desired to use the jaws 41.

Preferably a magnifying glass is supported over each set of scales for facilitating reading of the scales in making the adjustment.

With a commercial grinding attachment bolted to the carriage of the lathe, the bore locator may be used for grinding holes accurately spaced in hardened steel and with the aid of the steady rest holes can be bored or ground (as preferred) perfectly round. Since the bore locator is used on a lathe machine, it is also possible to bore tapered or threaded holes accurately spaced, when not using the attachment F.

It is thought from the foregoing description that the advantages and novel features of the invention will be readily apparent.

It is to be understood that changes may be made in the construction and in the combination and arrangement of the parts provided that such changes fall within the scope of the appended claims.

Having described the invention, what is claimed as new is:

1. A bore locator for a lathe comprising a body connected with the spindle nose of the head stock of the lathe for rotating with the spindle, a member slidably arranged on the outer face of the body, manually operated means for moving said member on the body, a jaw carrying member slidably arranged on the slide member for movement at right angles to the direction of movement of the slide member, manually operated variable speed means for sliding the jaw carrying member on the slide member, and jaws on the jaw carrying member for gripping the work piece.

2. A bore locator for a lathe comprising a body connected with the spindle nose of the head stock of the lathe for rotary movement with the spindle, a slide member carried by the body, a jaw carrying member slidably arranged on the slide member for movement at right angle to the direction of movement of the slide member, and separate means for sliding each member, each said separate means including a nut member, a screw shaft passing through the nut member, two gears of different sizes rotatably arranged on the screw shaft, manually operated clutch means for connecting either gear with the screw shaft or disconnecting both gears of the screw shaft, and a manually operated shaft provided with gears of different sizes for meshing with the other gears.

3. A bore locator for a lathe comprising a body connected with the nose spindle of the head stock of the lathe and for rotary movement with the spindle, a steady rest for the body supported from the lathe and including circumferentially spaced rollers and a hard metallic ring connected with the periphery of the body for engagement with said rollers, a slide member slidably connected with the outer face of the body, a second slide member connected for sliding movement to the first slide member and in a direction at right angles to the movement of the first member, manually operated means for adjusting each slide member, adjustable jaws carried by the second slide member and for holding a work piece thereon.

4. A bore locator for a lathe comprising a circular body connected with the spindle nose of the head stock of the lathe for rotary movement with the spindle, a slide member on the outer face of the body, a second slide member sliding on the first slide member and in a direction at right angles to the movement of the first member, manually operated and manually controlled means for moving each slide member at selected speeds, and means for locking each slide member in adjusted position.

5. A bore locator for a lathe comprising a circular body connected with the spindle nose of the head stock of the lathe for rotary movement with the spindle, a slide member on the outer face of the body, a second slide member sliding on the first slide member and in a direction at right angles to the movement of the first member, manually operated and manually controlled variable speed means for moving each slide member at selected speed, means for locking each slide member in adjusted position, jaws carried by the second slide member for holding the work piece thereon and the outer face of the second slide member having threaded holes therein for receiving bolts which may be used for holding the work piece in place or for holding parallels or a protective plate in place.

6. A bore locator for a lathe comprising a body connected with the spindle nose of the head stock of the lathe, a slide member slidably arranged on the outer face of the body, a second slide member slidably arranged on the first slide member and in a direction at right angles to the movement of the first slide member, jaws carried by the second slide member, manually operated means for moving each slide member, and counterweights connected to the slide members for counterbalancing the parts when a slide member has been moved to a point adjacent an end of its movement.

7. A bore locator for a lathe comprising a body connected with the spindle nose of the head stock of the lathe, a slide member slidably arranged on the outer face of the body, a second slide member slidably arranged on the first slide member and in a direction at right angles to the movement of the first slide member, jaws carried by the second slide member, manually operated means moving each slide member and counterweights connected to the slide members for counterbalancing the parts when a slide member has been moved to a point adjacent an end of its movement, each counterweight having a plurality of holes therein for receiving weight pellets.

STANLEY J. WOSZCZYNA.